(12) United States Patent
Tashiro et al.

(10) Patent No.: US 10,656,687 B2
(45) Date of Patent: May 19, 2020

(54) ADAPTER AND HOUSING DOCK FOR SINGLE BOARD COMPUTER

(71) Applicant: Switch On LLC, Niigata (JP)

(72) Inventors: Eiichirou Tashiro, Niigata (JP); Katsuki Oishi, Niigata (JP)

(73) Assignee: Switch On LLC, Niigata (JP)

( * ) Notice: Subject to any disclaimer, the term of this patent is extended or adjusted under 35 U.S.C. 154(b) by 0 days.

(21) Appl. No.: 16/251,191

(22) Filed: Jan. 18, 2019

(65) Prior Publication Data

US 2019/0324505 A1 Oct. 24, 2019

(30) Foreign Application Priority Data

Apr. 23, 2018 (JP) ................... 2018-082552

(51) Int. Cl.
*G06F 1/18* (2006.01)

(52) U.S. Cl.
CPC .............. *G06F 1/181* (2013.01); *G06F 1/184* (2013.01); *G06F 1/185* (2013.01)

(58) Field of Classification Search
CPC ........... G06F 1/184; G06F 1/185; G06F 1/181
See application file for complete search history.

(56) References Cited

U.S. PATENT DOCUMENTS

| | | | |
|---|---|---|---|
| 6,053,760 A | 4/2000 | Bailis et al. | |
| 6,078,504 A * | 6/2000 | Miles | G06F 1/184 |
| | | | 174/17 CT |
| 6,325,636 B1 * | 12/2001 | Hipp | G06F 1/183 |
| | | | 361/788 |
| 8,270,172 B2 * | 9/2012 | Sporer | H05K 7/20545 |
| | | | 361/719 |
| 10,019,042 B1 * | 7/2018 | Franklin | H05K 7/1492 |
| 10,085,355 B2 | 9/2018 | Giefers | |
| 2006/0221559 A1 | 10/2006 | Campini et al. | |
| 2007/0081308 A1 | 4/2007 | Ishida | |
| 2011/0298342 A1 * | 12/2011 | Li | G06F 1/185 |
| | | | 312/223.2 |

(Continued)

FOREIGN PATENT DOCUMENTS

| | | |
|---|---|---|
| JP | 2013-526040 A | 6/2013 |
| JP | 5926535 B2 | 5/2016 |
| WO | 2011/133777 A1 | 10/2011 |

*Primary Examiner* — Nidhi Thaker
(74) *Attorney, Agent, or Firm* — Akerman LLP

(57) ABSTRACT

Provided is an adapter adapted for a specific single board computer. The adapter is readily usable without taking time and effort to wire and arrange accessories. The adapter includes an adapter body adapted to a specific single board computer selected from a plurality of different single board computers. The adapter body is detachably mountable, in a configuration being fitted with the specific single board computer, on a docking station mounted with one or more accessories. The adapter further includes: one or more receptacle connector components mounted on the adapter body, and being attachable to the main connector components; one or more connector components mounted on the adapter body, and being attachable to receptacle connector components electrically connected to the accessories of the docking station; and one or more wires arranged in the adapter body and electrically connecting the receptacle connector components respectively to the connector components.

10 Claims, 8 Drawing Sheets

(56) References Cited

U.S. PATENT DOCUMENTS

2012/0113589 A1    5/2012  Sporer
2016/0275036 A1*   9/2016  Chew .................. G06F 13/4081
2017/0215292 A1*   7/2017  Giefers ................ H05K 5/0217

* cited by examiner

ADAPTER AND HOUSING DOCK FOR SINGLE BOARD COMPUTER

CROSS-REFERENCE TO RELATED APPLICATIONS

This application claims priority to Japanese patent application No. 2018-082552 filed Apr. 23, 2018, the entirety of which is incorporated herein by reference.

TECHNICAL FIELD

This disclosure generally relates to an adapter and a housing dock for a Single Board Computer (SBC) enabling connection between the SBC and accessories.

BACKGROUND

SBCs such as Raspberry Pi and Ichigo Jam® have been drawing attention in recent years in a wide range of fields as recommendable products that help anyone, from children to adults, to find delights in making something while at the same time having fun. The SBCs are generally composed of a single exposed circuit board and a CPU, a storage medium, input/output interfaces, connectors and/or any other peripheral components mounted thereon. The SBCs may employ a lightweight language, which offers an advantage of manipulating the SBC just like a regular personal computer. As an example of such SBC, JP2013/526040 and JP5926535 disclose conductive cooling structures for SBCs. Moreover, US2016/275036, U.S. Pat. Nos. 10,019,042 and 10,085,355 disclose housing structures for SBCs, and US2007/0081308, US2006/0221559 and U.S. Pat. No. 6,053,760 all disclose mounting structures for a computer module not involving any SBC.

In conventional SBCs, accessories, such as a monitor, a keyboard and a power source that are arranged by individual users have generally been wired by himself/herself to make use of the SBCs. Unfortunately, such SBCs are poor in portability, and need extra care for the wiring or preparation of the accessories. Moreover, for the connectors, which are also referred to herein as connector components, no common standards have been established heretofore between different SBC products, or between different versions of the same product. For these reasons, in order to make a different usage based on individual products, users have no choice but to arrange extra connectors and/or conversion adapters which are compatible with the standard of the product.

SUMMARY

Technical Problem

In view of the above-noted problems, it is an object of the present disclosure to provide an SBC adapter and an SBC storage dock in which the corresponding SBC is readily used without taking time and effort to wire and arrange accessories for any types of products.

Solution to Problem

A first aspect of the present disclosure is an adapter for single board computer comprising:

an adapter body adapted to a specific single board computer selected from a plurality of different single board computers each including a circuit board, one or more electronic components mounted on the circuit board and one or more first connector components mounted on the circuit board, said adapter body being detachably mountable, in a configuration being fitted with the specific single board computer, on a docking station mounted with one or more accessories;

one or more first receptacle connector components mounted on the adapter body, and being detachable from or attachable to the first connector components;

one or more second connector components mounted on the adapter body, and being detachable from or attachable to one or more second receptacle connector components electrically connected to the accessories; and one or more wires arranged in the adapter body and electrically connecting the first receptacle connector components respectively to the second connector components, wherein said adapter body comprises
a stationary member having a housing portion for the single board computer; and
a movable member mounted with the first receptacle connector components, said movable member movable with respect to the stationary member, and wherein the first connector components and the first receptacle connector components are arranged to be faced with each other along a moving path of the movable member when the single board computer is accommodated in the housing portion.

A second aspect of the present disclosure is the adapter according to the first aspect wherein the stationary member comprises a guiding groove extending along the moving path of the movable member, and the movable member is provided with a plate member slidably engageable with the guiding groove therealong.

A third aspect of the present disclosure is the adapter according to the first aspect wherein the housing portion comprises sidewalls in a perimeter thereof, the sidewalls including a first abutment face configured to allow the first connector components to face the first receptacle connector components when an end face of the single board computer is abutted against the first abutment face.

A fourth aspect of the present disclosure is the adapter according to the third aspect wherein the second connector components are mounted on the stationary member, and the first abutment face is configured as a partition separating the single board computer, accommodated in the housing portion, from the wires being drawn from the movable member and connected to the second connector components.

A fifth aspect of the present disclosure is the adapter according to the third aspect wherein the stationary member comprises a second abutment face that comes into abutment with the movable member when the movable member has been displaced to the stationary member.

A sixth aspect of the present disclosure is the adapter according to the third aspect wherein the stationary member includes an opening facing toward one or more third connector components, said third connector components being mounted on the circuit board along with the first connector components but not connected to the first receptacle connector components, and the opening and the first abutment face are respectively arranged on first and second opposing ends of the housing portion such that a direction in which external devices are inserted via the opening into the third connector components to be attached thereto coincide with a direction in which an end face of the single board computer abuts against the first abutment face when the single board computer is accommodated in the housing portion.

A seventh aspect of the present disclosure is the adapter according to the sixth aspect wherein the movable member includes a first passage space having an interior closed by a first attachment plate configured to attach the first receptacle connectors, the stationary member includes a second passage space having an interior closed by a second attachment plate configured to attach the second connectors, and the movable member further includes a communication opening for guiding the wires from the first receptacle connector components to the second connector components, said communication opening being arranged opposite to an entrance opening of the second passage space.

An eighth aspect of the present disclosure is the adapter according to the seventh aspect wherein the second passage space is formed between the sidewalls and the second attachment plate.

A ninth aspect of the present disclosure is the adapter according to the first aspect wherein the adapter body has an external shape identically designed for all of the different single board computers, and is mounted with the second connector components that are identically designed for all of the different single board computers and are arranged at positions common to all of the different single board computers.

A tenth aspect of the present the invention is a storage dock for single board computer comprising:

a docking station mounted with one or more accessories;

an adapter body adapted to a specific single board computer selected from a plurality of different single board computers each including a circuit board, one or more electronic components mounted on the circuit board and one or more first connector components mounted on the circuit board, said adapter body being detachably mountable, in a configuration being fitted with the specific single board computer, on the docking station;

one or more first receptacle connector components mounted on the adapter body, and being detachable from or attachable to the first connector components;

one or more second connector components mounted on the adapter body, and being detachable from or attachable to one or more second receptacle connector components electrically connected to the accessories; and one or more wires arranged in the adapter body and electrically connecting the first receptacle connector components respectively to the second connector components, wherein said adapter body comprises a stationary member having a housing portion for the single board computer; and a movable member mounted with the first receptacle connector components, said movable member movable with respect to the stationary member, and wherein the first connector components and the first receptacle connector components are arranged to be faced with each other along a moving path of the movable member when the single board computer is accommodated in the housing portion.

Advantageous Effects of Invention

According to the first and tenth aspects of the present disclosure, SBCs may be readily used without taking time and effort to wire and arrange accessories for any types of products. Further, first connector components on a circuit board of the SBC and first receptacle connector components on the adapter body may be readily be mounted/detached with each other to make a more quick usage of the SBC than those without these adapters.

According to the second aspect of the present disclosure, the movable member may be easily displaced, relative to the stationary member accommodating the single board computer in the housing portion, in a direction along the guiding groove to attach or detach the first connector components and the first receptacle connector components from each other.

According to the third aspect of the present disclosure, the position of the single board computer relative to the housing portion may be naturally set so that the first connector components and the first receptacle connector components are faced with each other when the single board computer is accommodated in the housing portion of the stationary member.

According to the fourth aspect of the present disclosure, the first abutment face, configured originally for positioning the first connector components and the first receptacle connector components to be faced with each other, may also be served as the partition for keeping the wires, drawn from the movable member, off the single board computer accommodated in the housing portion.

According to the fifth aspect of the present disclosure, once the movable member comes into abutment against the second abutment face of the stationary member, the movable member cannot be moved any more toward the stationary member. For this reason, the first connector components may be attached to the opposing first receptacle connector components without exerting an excessive stress.

According to the sixth aspect of the present disclosure, when inserting external devices such as USB receivers, via the opening of the stationary member, into the third connector components of the single board computer, once an end face of the single board computer comes into abutment with the first abutment face, the single board computer cannot be moved any more inside the housing portion. For this reason, the first abutment face, configured originally for positioning the first connector components and the first receptacle connector components to be faced with each other, may also be served to stably attach the external devices to the third connector components.

According to the seventh aspect of the present disclosure, there may be minimized an exposed area of the wires between the movable member and the stationary member while electrically connecting the first receptacle connector components to the second connector components with the shortest wiring distance.

According to the eight aspect of the present disclosure, the second passage space, interposed between the sidewalls and the second attachment plate, may help to avoid an excessive stress that is otherwise applied to the second connector components, attached to the second attachment plate, and the second receptacle connector components connected to the second connector components even when an end face of the single board computer may be strongly hit against the sidewall within the housing portion of the stationary member. Moreover, the wires accommodated in the second passage space may be safely protected.

According to the ninth aspect of the present disclosure, the docking station may take a consistent outer receptacle shape, and may employ a second receptacle connector component to be consistently used to thereby improve the versatility of the docking station.

BRIEF DESCRIPTION OF THE FIGURES

For a more complete understanding of the present disclosure and its features and advantages, reference is now made to the following description, taken in conjunction with the accompanying drawings, in which.

DETAILED DESCRIPTION

Embodiments of the adapter for single board computer (SBC) according to the present disclosure are best understood by referring to FIGS. 1 to 9C of the drawings, like numerals being used for like and corresponding parts of the various drawings.

Figure 1:
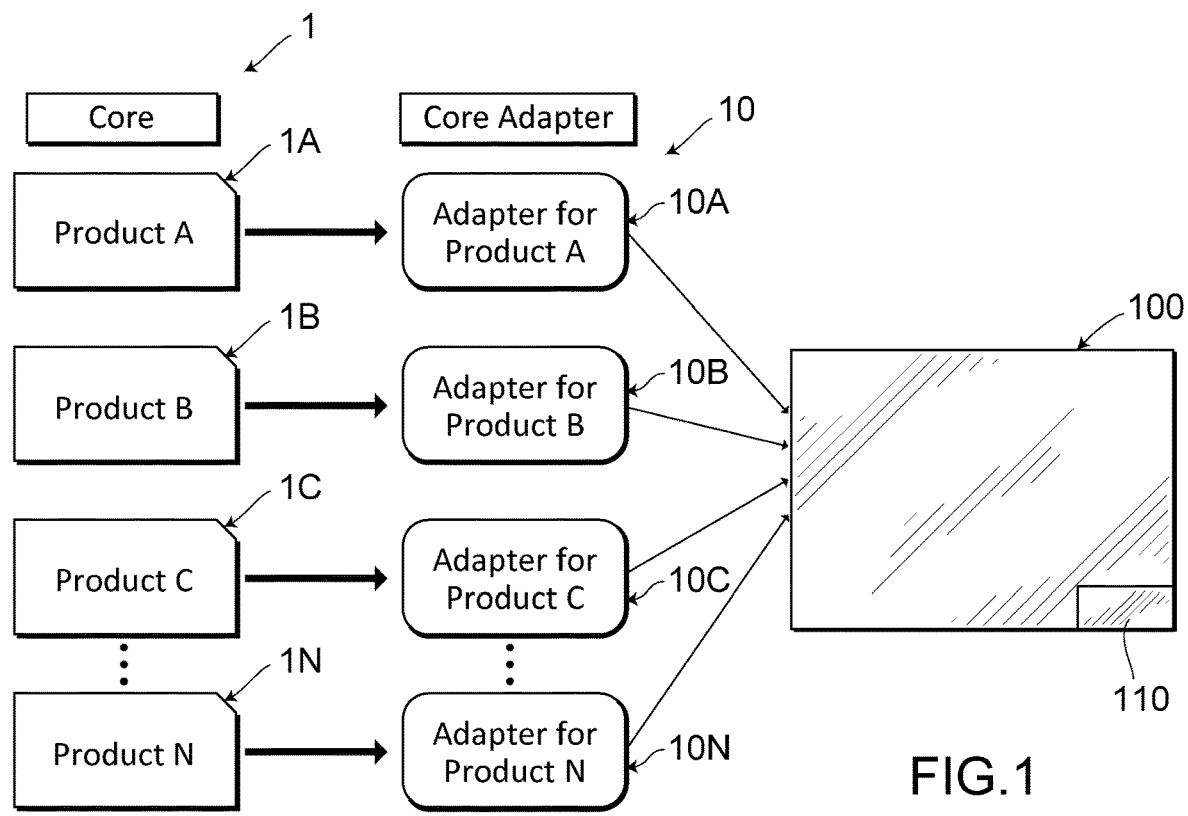
FIG. 1 illustrates a relation between SBCs and SBC adapters according to an embodiment of the present disclosure.

FIG. 1 schematically illustrates a relationship between SBCs and corresponding SBC adapters of the present embodiment. The figure illustrates an SBC 1 serving as a core, adapters 10 serving as core adapters to be connected/disconnected to the SBCs 1, and a docking station 100 that is attachable to one of the adapters 10 installed with the SBC 1. The docking station 100 constitutes a station of an SBC housing dock having one of the adapters 10, and is installed, in advance, with an accessory 110 serving as a peripheral device of the SBC 1.

In the field of Single board computers (SBCs 1), various types of products A, B, C . . . of different specs or programming languages are currently available in the markets. In an embodiment of the present disclosure, adapters 10A, 10B and 10C are respectively provided in pair with the corresponding products A, B, C. For example, as for SBC 1 of the product A, the product A may be mounted on an adapter 10A adapted specifically to the product A in order to install the product A in the docking station 100 via the adapter 10A. As for another SBC 1 of the product B, the product B may be mounted on an adapter 10B adapted specifically to the product B in order to install the product B in the docking station 100 via the adapter 10B. The same accessory 110 may be used for both of the products A and B. Similarly, other product C or a product N of upcoming SBCs to be released in the future may be mounted on the same docking station 100 via an adapter C specifically designed therewith or via a corresponding adapter 10N. Embodiments of the present disclosure will be described hereafter with a reference numeral 1A being assigned to the SBC 1 of the product A, a reference numeral 1B being assigned to the SBC 1 of the product B, and a reference numeral 1C being assigned to the SBC 1 of the product C.

Figure 2:
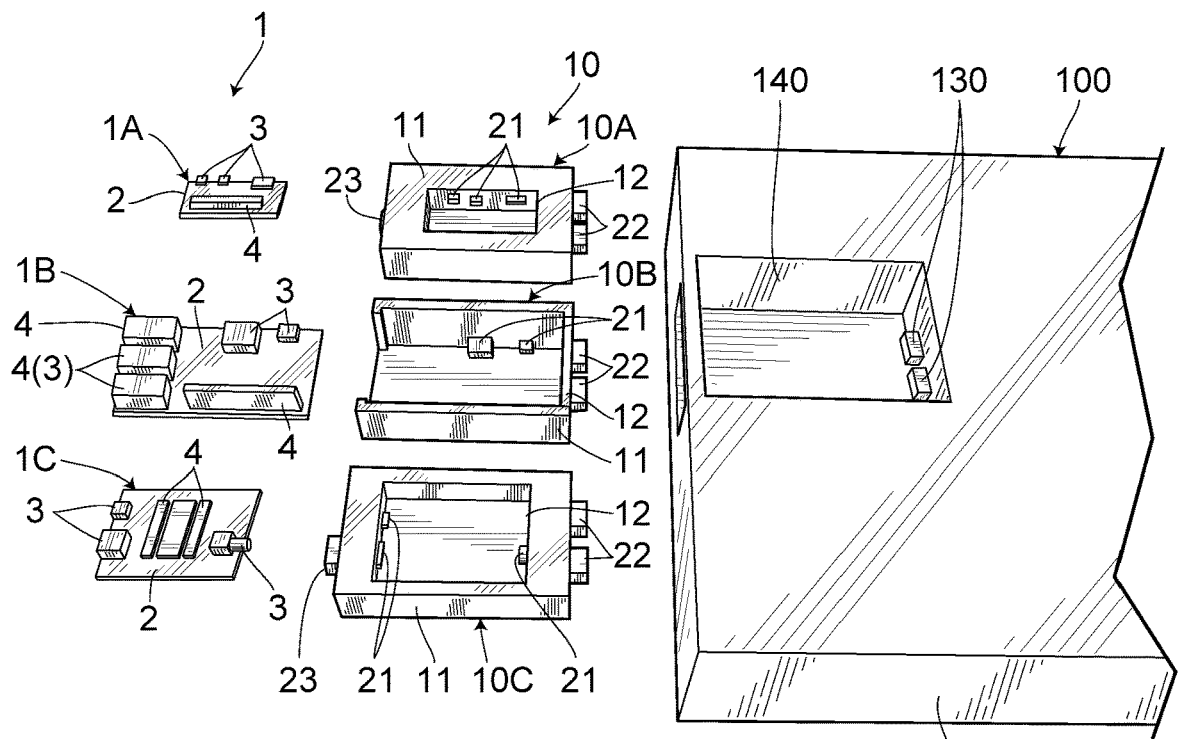
FIG. 2 is a perspective view illustrating a main framework of a docking station and SBC adapters as provided based on the type SBCs according to an embodiment of the present disclosure.

FIG. 2 illustrates detailed configurations for the above-noted structures. The SBCs 1A to 1C each includes a circuit board 2 on which wire patterns are print-formed on the surface of an insulated substrate. The circuit board 2 is arranged with main connector components 3 necessary for the connection to the accessories 110 of the docking station 100 and sub connector components 4 necessary for the connection to external devices not involving the accessories 110. Although not shown in the figure, the circuit board 2 may further includes other electronic components such as a CPU necessary to operate the SBCs 1A to 1C, a memory medium, peripheral components and/or input/output interfaces.

The adapter 10A to 10C are each arranged such that an adapter body 11 of boxy shape, defining an outline of the adapter, is mounted with receptacle connector components 21, attachable to or detachable from the main connector components 3 of the corresponding SBCs 1A to 1C, and connector components 22 attachable to or detachable from receptacle connector components 130 mounted on a housing 120 of the docking station 100.

The adapter body 11 is formed with a housing portion 12 of a recessed shape having dimensions slightly larger than the external dimensions of the SBC 1A to 1C in order for the corresponding SBCs 1A to 1C to be smoothly accommodated in the adapter body 11. Accordingly, the dimensions of the housing portion 12 for the adapters 10A to 10C depend on the dimensions of the corresponding SBCs 1A to 1C. Meanwhile, the external shape of the adapter body 11 is formed same as ever independently on the type of the adapters 10A to 10C. A housing 120 that delimits an outline of the docking station 100 is provided with a recessed SBC storage compartment 140 which is formed to have dimensions capable of smoothly accommodating one of the adapters 10A to 10C.

The adapters 10A to 10C are each configured such that one or more receptacle connector components 21 are inwardly protruded from a sidewall of the housing portion 12. In this embodiment, the positions of the receptacle connector components 21 for each of the adapters 10A to 10C are varied depending to the positions of the main connector components 3 for each of the corresponding SBCs 1A to 1C as a core. Further, on one side of a sidewall of the adapter body 11 are arranged one or more connector components 22 that are outwardly protruded. These connector components 22 are arranged in the same position independently of the adapters 10A to 10C. Receptacle connector components 130, electrically connected to the accessories 110, are arranged on an inner sidewall of the SBC storage compartment 140 of the docking station 100 at positions opposing to the connector components 22.

Although not shown in the figures, all or part of the receptacle connector components 21, provided on each of the adapters 10A to 10C, may be electrically connected to the connector components 22 in the adapter body 11. For example, the adapter 10B for the SBC 1B may be configured such that all of the receptacle connector components 21 are connected to the connector components 22, but the adapters 10A and 10C respectively adapted for the SBC 1A and SBC 1C may be configured such that a part of the receptacle connector components 21 are electrically connected to the connector components 22 while the rest of the receptacle connector components 21 are connected to another connector component 23 arranged an sidewall on the other side of the adapter body 11. The connector component 23 is not configured to be attached to the receptacle connector component 130 of the docking station 100. Nevertheless, the connector component 23 is exposed to the outside, and the connector component 23 may be used to make a wired or wireless electrical connection between a part of the accessories 110 of the docking station 100 and the SBC 1A or 1C.

Further, the sub connector components 4 may be functioned as the main connector components 3 depending on the type of the SBCs 1. For example, a part of the sub connector components 4 of the SBC 1B may be arranged in an manner exposed from a second side of the adapter 1B when being accommodated in the housing portion 12 so that the sub connector components 4 may be functioned as main connector components 3 to make a wired or wireless electrical connection between a part of the accessories 110 of the docking station 100 and the SBC 1B.

As for the SBCs 1A to 1C, detailed steps for connecting the SBCs 1A to 1C to the accessories 110 of the docking station 100 will be explained hereunder.

Figure 3A:
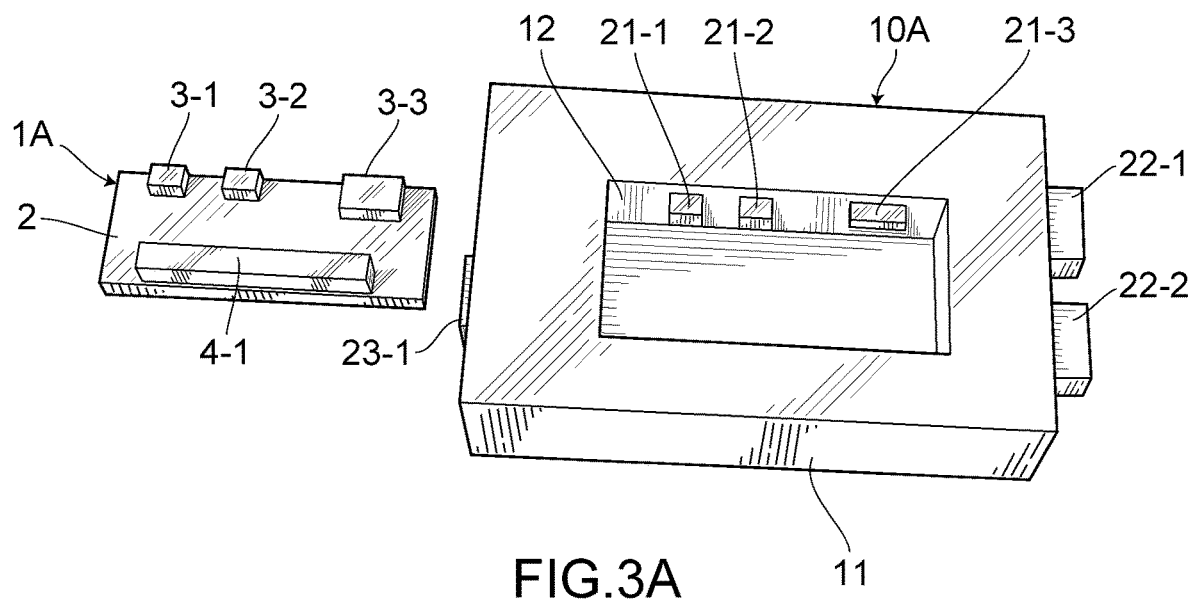
FIG. 3A is a perspective view of the SBC adapter and the SBC prior to the attachment of the SBC for a product A to the SBC adapter that is adapted specifically for the product according to an embodiment of the present disclosure.
Figure 3B:
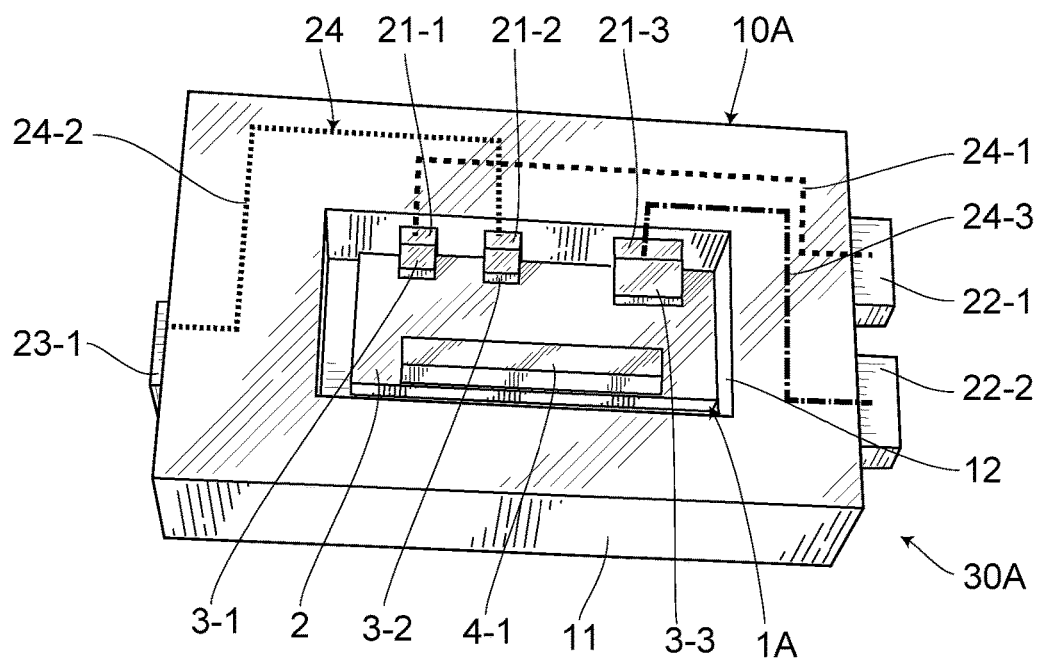
FIG. 3B is a perspective view illustrating electrical wiring inside an adapter of an SBC subunit in which the SBC of the product A is mounted on the SBC adapter that is adapted specifically to the product according to an embodiment of the present disclosure.
Figure 3C:
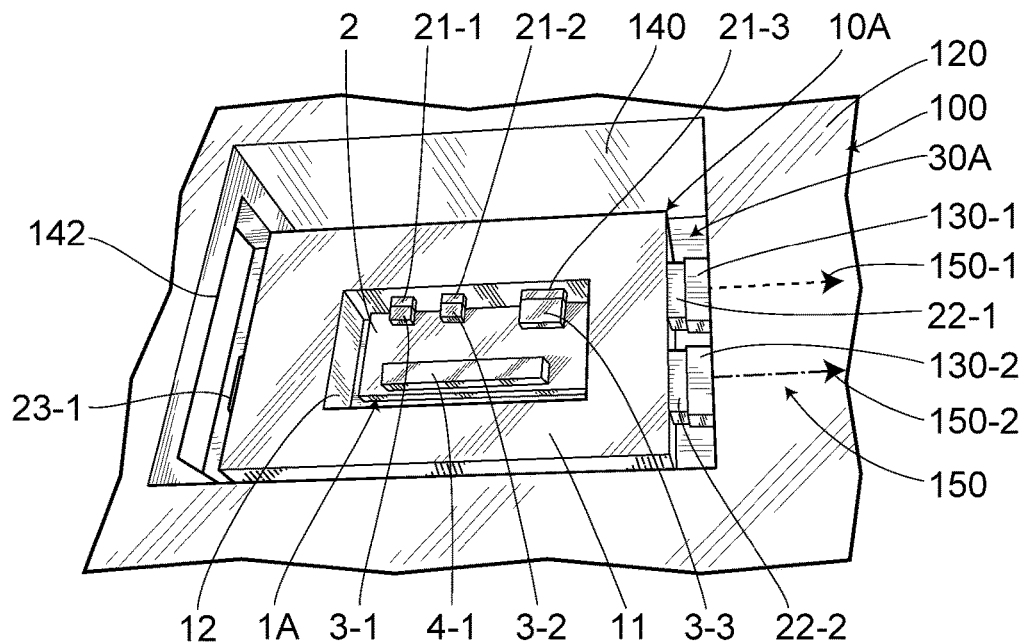
FIG. 3C is a perspective view of the SBC subunit in which the SBC subunit of FIG. 3B is mounted on the docking station.

FIGS. 3A to 3C illustrate steps for electrically connecting the SBC 1A of the product A to the accessories 110 of the docking station 100. In each of the figures, the SBC 1A is configured such that a micro USB (Universal Serial Bus) connector 3-1 functioning as a power supply terminal for feeding an electric power to the SBC 1, a micro USB connector 3-2 functioning as a data communication terminal for permitting data communication to the accessories 110; and an HDMI® (High-Definition Multimedia Interface) connector 3-3 for allowing transmission of digital video and sound signals are arranged side-by-side, as the above-noted main connector components 3, on a surface side of the circuit board 2 having a rectangular shape in the plan view. Further, general-purpose input/output (GPIO) pins 4-1 are arranged as the above-noted sub connector components 4 on the surface side of the circuit board 2.

Meanwhile, the adapter 10A specific to the SBC 1A is configured such that a micro USB receptacle connector 21-1 functioning as a power supply receptacle terminal for the opposing micro USB connector 3-1 (also referred to as a power supply micro USB receptacle connector 21-1 hereunder), a micro USB receptacle connector 21-2 functioning as a data receptacle communication terminal for the opposing micro USB connector 3-2 and an HDMI receptacle connector 21-3 functioning as an audiovisual receptacle terminal for the opposing HDMI connector 3-3 (also referred to as an audiovisual HDMI receptacle connector 21-3 or as a visual HDMI receptacle connector 21-3 hereunder) are arranged side-by-side as the above-noted receptacle connector component 21 on a sidewall of the housing portion 12. Further, the adapter 10A is configured such that a power supply port 22-1 and a HDMI port 22-2 working as an audiovisual port (also referred to as an audiovisual HDMI port 22-2) are arranged side-by-side as connector components 22 on the first side of the sidewall of the adapter body 11 while a USB port 23-1 for an operating part such as a mouse and a keyboard that constitute accessories 110 (also referred to as an operation USB port 23-1) is arranged on a second side of the sidewall of the adapter body 11 as a connector component 23.

As illustrated in FIG. 3B, wires 24 are arranged inside the adapter body 11 for making an electric connection between the receptacle connector components 21 and the connector components 22 and 23. Specifically, the micro USB receptacle connector 21-1 and the power supply port 22-1 are electrically connected with each other via a wire 24-1, the micro USB receptacle connector 21-2 and the operation USB port 23-1 are electrically connected with each other via a wire 24-2, and the HDMI receptacle connector 21-3 and the HDMI port 22-2 are electrically connected with each other via a wire 24-3.

As illustrated in FIG. 3C, the docking station 100 is configured such that a power supply receptacle port 130-1 facing toward the power supply port 22-1 and an audiovisual receptacle port 130-2 facing toward the HDMI port 22-2 are arranged side-by-side on the inner sidewall of the SBC storage compartment 140. Further, an outlet window 142 having the shape of a slit is formed with a clearance in the housing 120 such that a user may insert his/her finger directly into the front of the operation USB port 23-1 from the outside of the docking station 100 when the adapter 10A is accommodated in the SBC storage compartment 140.

Wires 150 are arranged inside the adapter body 120 for making an electric connection between the receptacle connector components 130 and the accessories 110 provided in the docking station 100. Specifically, a battery (not illustrated), serving as a power source device as an accessory 110, and the power supply receptacle port 130-1 are electrically connected with each other via a wire 150-1. An accessory 110 such as a monitor and a speaker (not shown neither of them) and an audiovisual receptacle port 130-2 are electrically connected with each other via another wire 150-2.

In a configuration as shown above, in order to connect the SBC 1A electrically to the accessories 110 of the docking station 100, the adapter 10A adapted specifically to the SBC1A is first provided and then the SBC 1A is accommodated within the housing portion 12 of the adapter 10A to attach the connectors 3-1 to 3-3 respectively to the receptacle connectors 21-1 to 21-3, facing thereto, of the adapter 10A. As illustrated in FIG. 3B, since the wires 24 are wired in advance in the adapter 10A, when the SBC 1A is accommodated in and attached to the adapter 10A to take on a configuration of the SBC subunit 30A, the micro USB connector 3-1 and the HDMI connector 3-3 of the SBC 1A are respectively connected to the power supply port 22-1 and the audiovisual HDMI port 22-2 of the adapter 10A, and the micro USB connector 3-2 of the SBC 1A is connected to the operation USB port 23-1 of the adapter 10A.

The SBC subunit 30A as shown in FIG. 3B is then accommodated in the SBC storage compartment 140 of the docking station 100 to attach the power supply port 22-1 and the HDMI port 22-2 of the adapter 10A respectively to the power supply receptacle port 130-1 and the audiovisual receptacle port 130-2, facing toward the power supply port 22-1 and the HDMI port 22-2, in the docking station 100. FIG. 3C illustrates such configuration, which allows the battery, the monitor and the speaker, provided as accessories 110 of the docking station 100, to be electrically connected to the SBC 1A in a simple manner. If the docking station 100 is provided with a wireless keyboard or a wireless mouse as accessories 110, a USB receiver R (shown in FIG. 8) having radio receiving capability may be inserted via the outlet window 142 into the operation USB port 23-1 to make a wireless electric connection between the SBC 1A and these keyboard and/or mouse.

As for the SBC B of the product B, a sequence of steps for connecting the SBC 1B to the accessories 110 of the docking station 100 will be explained hereunder. In each of the FIGS. 4A to 4C, the SBC 1B is configured such that the power supply micro USB connector 3-1 and the audiovisual HDMI connector 3-3 are arranged, as the above-noted main connector components 3, on a surface side of the circuit board 2 having a rectangular shape in the plan view. In addition to these, a USB connector 3-4 as a data communication terminal (also referred to as a data communication USB connector 3-4 hereunder) having a dual function serving also as the sub connector components 4 is arranged on the surface side of the circuit board 2. Further, on the surface side of the circuit board 2 are arranged, as the sub connector components 4, not only the above noted GPIO pins 4-1 but also a plurality of USB connectors 4-2 serving as an external data communication terminal that enables various data to be communicated to various devices other than the accessories 110, and a wired LAN port 4-3 for permitting access to the Local Area Network (LAN) to be used as a communication network.

The adapter 10B adapted specifically to the SBC 1B is configured such that the power supply micro USB receptacle connector 21-1 and the audiovisual HDMI receptacle connector 21-3 are arranged side-by-side as the receptacle connector components 21 on a sidewall of the housing portion 12. The adapter 10B is further configured such that the power supply port 22-1 and the audiovisual HDMI port 22-2 are arranged side-by-side as connector components 22 on a sidewall at one side of the adapter body 11 while the other side of the adapter body 11 is provided with an opening 13 which communicates with the housing portion 12 for avoiding interference with electric connections to the USB connector 4-2 and/or to the LAN port 4-3.

Figure 4A:
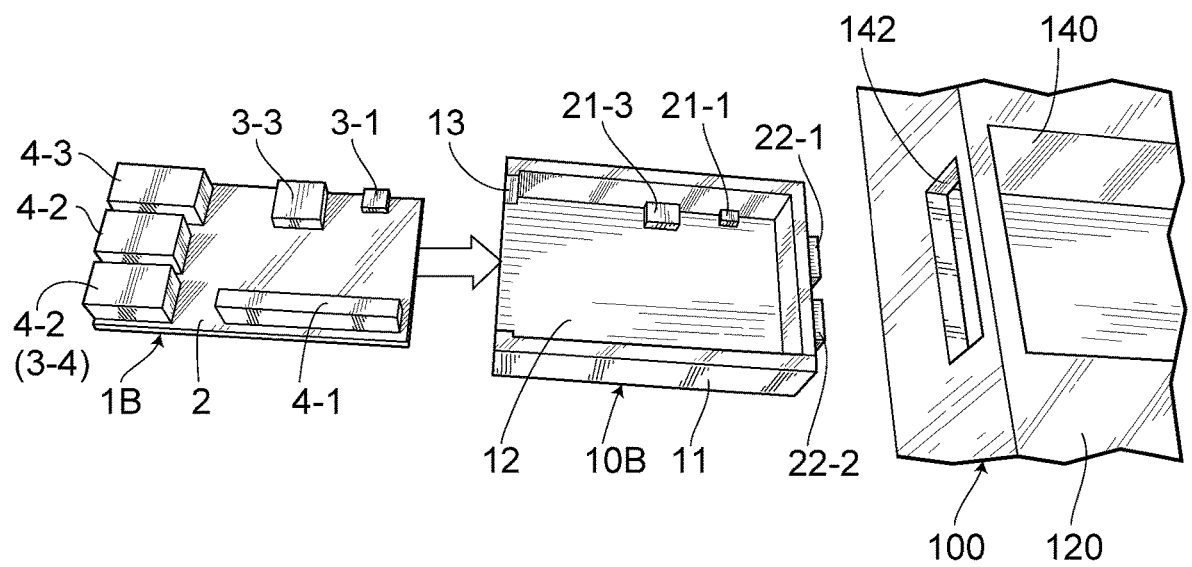
FIG. 4A is a perspective view of the SBC adapter and the SBC prior to the attachment of the SBC for a product B to the SBC adapter that is adapted specifically to the product according to an embodiment of the present disclosure.
Figure 4B:
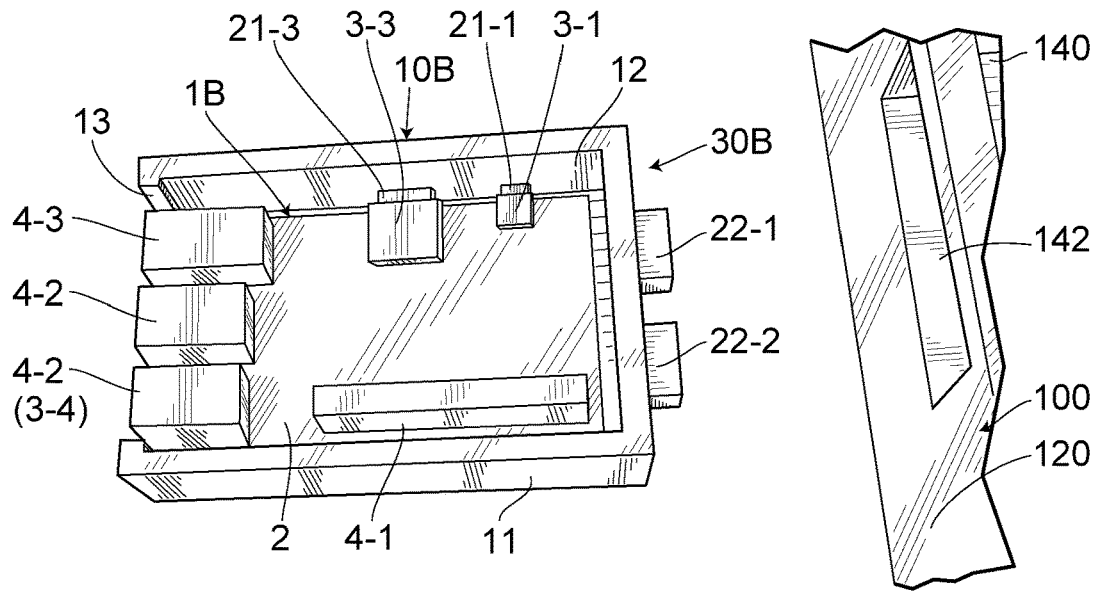
FIG. 4B is a perspective view illustrating a main framework of the docking station and the SBC subunit in which the SBC for the product B is attached to the SBC adapter that is adapted specifically to the product according to an embodiment of the present disclosure.
Figure 4C:
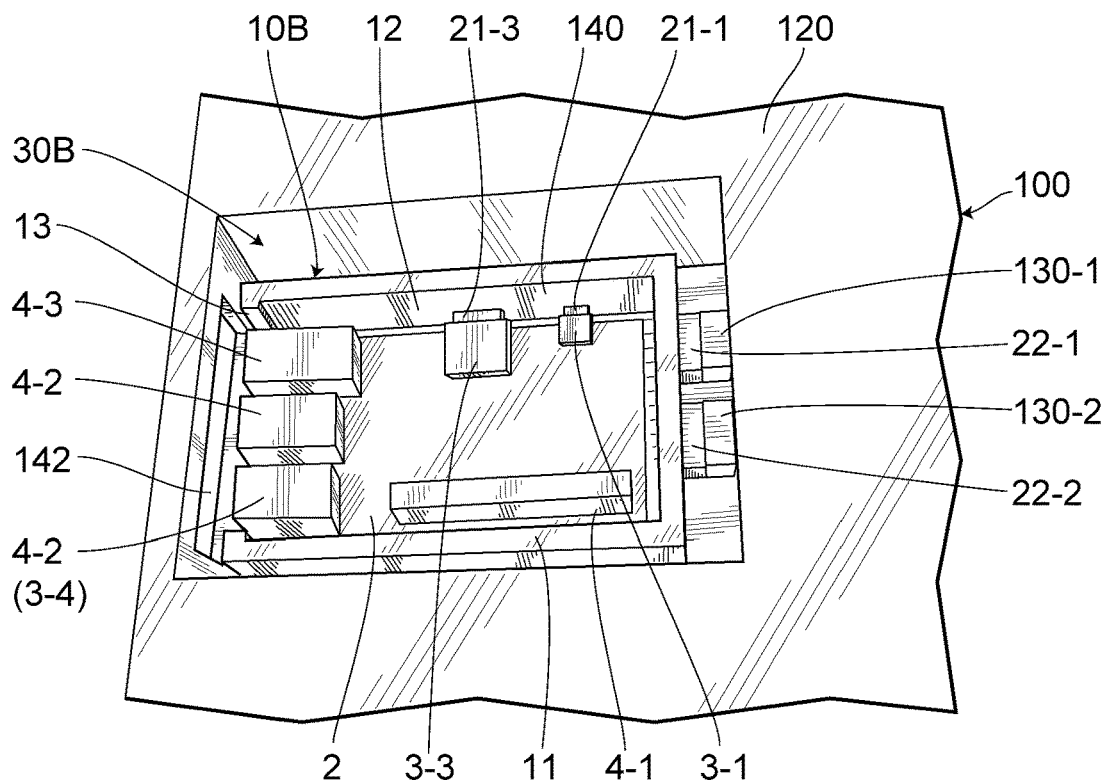
FIG. 4C is a perspective view of the SBC subunit of FIG. 4B being mounted on the docking station according to an embodiment of the present disclosure.

Although not shown in FIG. 4B, inside the adapter body 11 are respectively arranged: a wire 24-1 for making an electrical connection between the micro USB receptacle connector 21-1 and the power supply port 22-1; and a wire 24-3 for making an electrical connection between the HDMI receptacle connector 21-3 and the HDMI port 22-2. The docking station 100 has a configuration that is common to those as already explained.

As illustrated in FIG. 4A, in order to connect the SBC 1B electrically to the accessories 110 of the docking station 100, the adapter 10B adapted specifically to the SBC 1B is first provided and then the SBC 1B is accommodated within the housing portion 12 of the adapter 10B to attach the connectors 3-1 and 3-3 respectively to the receptacle connectors 21-1 and 21-3, facing thereto, of the adapter 10A. As the SBC 1B is accommodated in and attached to the adapter 10B to take on a configuration of the SBC subunit 30B, the micro USB connector 3-1 and the HDMI connector 3-3 of the SBC 1B are respectively connected to the power supply port 22-1 and to the audiovisual HDMI port 22-2 of the adapter 10B. The USB connector 4-2 and the LAN port 4-3 of SBC 1B are arranged so that the respective insertion ports thereof are faced toward the opening 13.

The SBC subunit 30B as shown in FIG. 4B is then accommodated in the SBC storage compartment 140 of the docking station 100 to attach the power supply port 22-1 and the HDMI port 22-2 of the adapter 10B respectively to the power supply receptacle port 130-1 and the audiovisual receptacle port 130-2 that are facing toward the power supply port 22-1 and the HDMI port 22-2 and are provided in the docking station 100 to readily achieve an electrical connections for the SBC 1B to a battery, a monitor and a speaker which are all configured as the accessories 100 of the docking station 100. The USB receiver R as explained above may be inserted via the outlet window 142 of the docking station 100 through the opening 13 of the adapter 10B into the data communication USB connector 3-4 to be mounted thereon in order to make a wireless electric connection for the SBC 1B to a wireless keyboard and/or a wireless mouse that are configured as accessories 110.

As for the SBC C of the product C, a sequence of steps for connecting the SBC 1C to the accessories 110 of the docking station 100 will be explained hereunder. In each of the FIGS. 5A to 5C, the SBC 1C is configured such that the power supply terminal micro USB connector 3-1 and the data communication USB connector 3-4 are arranged, as the above-noted main connector components 3, on the surface side of the circuit board 2 having a rectangular shape in the plan view. In addition to these, as the above-noted main connector components 3, a 4 pole AV jack 3-5, configured as an analog audiovisual output terminal for allowing transmission of an analog video signal and an analog audio signal, is arranged on the surface side of the circuit board 2 having a rectangular shape in the plan view. On the surface side of the circuit board 2 is further arranged the GPIO pins 4-1 configured as a sub connector component 4.

The adapter 10C adapted specifically to the SBC 1C is configured such that the power supply micro USB receptacle connector 21-1 is arranged on a sidewall of the housing portion 12. In addition to this, a micro USB receptacle connector 21-4 for data communication (also referred to as a data communication micro USB receptacle connector 21-4) opposing to the micro USB connector 3-4 and an AV plug 21-5 functioning as an audiovisual receptacle terminal opposing to the AV jack 3-5 are respectively arranged on the opposing sidewalls of the housing portion 12. The adapter 10C is configured such that the power supply port 22-1, the audiovisual HDMI port 22-2 and the operation USB port 23-1 are arranged on the sidewalls of the adapter body 11.

Figure 5A:
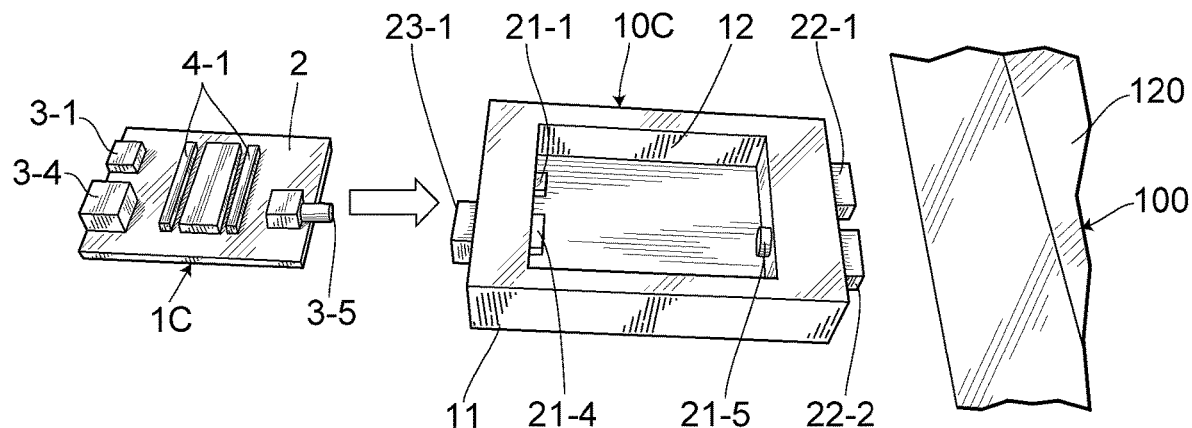
FIG. 5A is a perspective view of the SBC adapter and the SBC prior to the attachment of the SBC for a product C to the SBC adapter that is adapted specifically to the product according to an embodiment of the present disclosure.
Figure 5B:
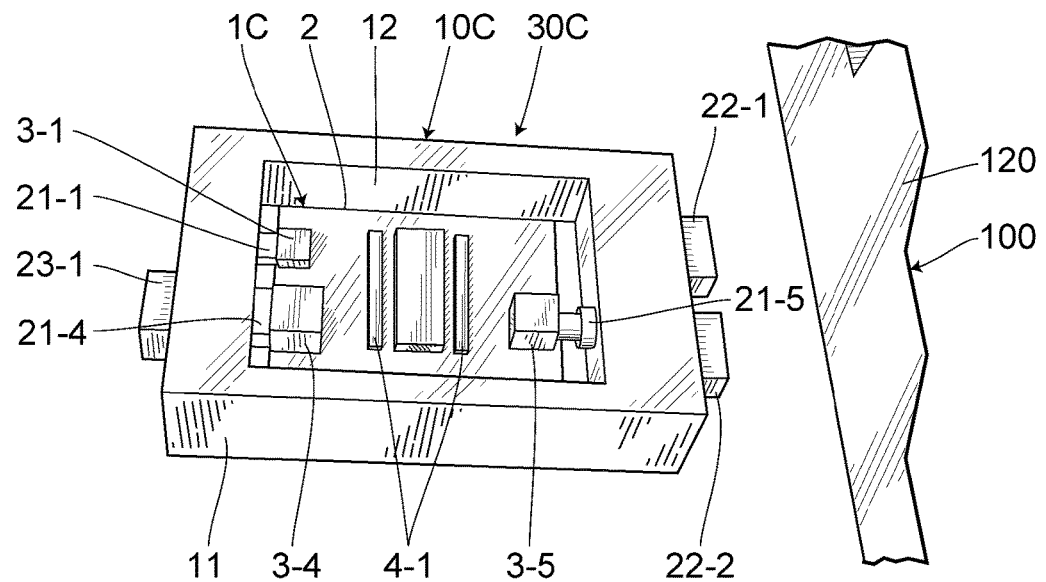
FIG. 5B is a perspective view illustrating a main framework of the docking station and the SBC subunit in which the SBC for the product C is mounted on the SBC adapter that is adapted specifically to the product according to an embodiment of the present disclosure.
Figure 5C:
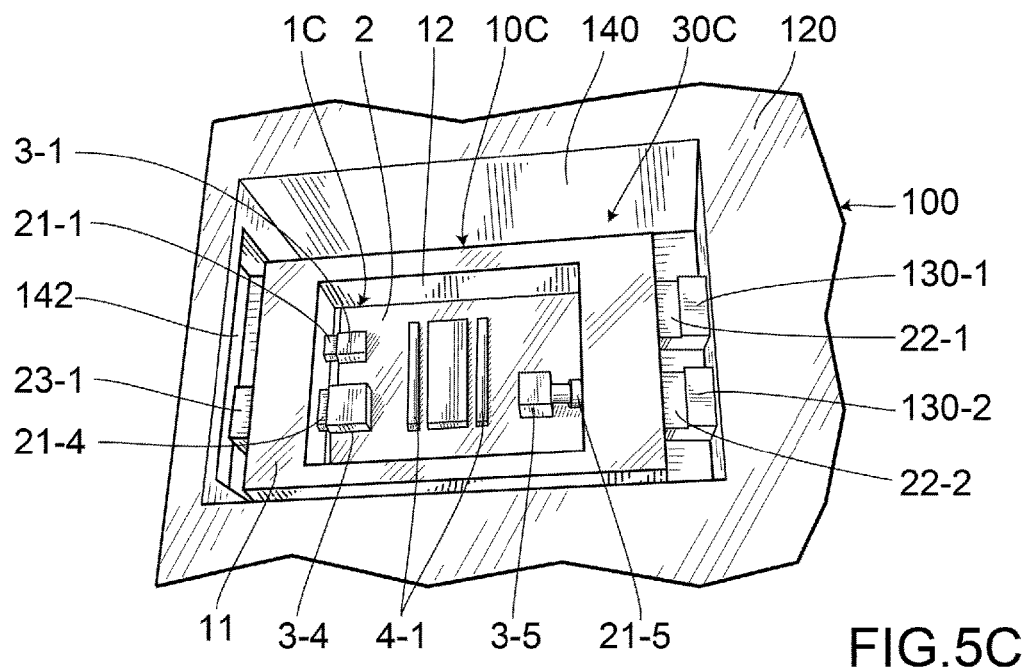
FIG. 5C is a perspective view of the SBC subunit in which the SBC subunit of FIG. 5B is mounted on the docking station according to an embodiment of the present disclosure.

Although not shown in FIG. 5B, inside the adapter body 11 are respectively arranged a wire 24-1 for making an electrical connection between the micro USB receptacle connector 21-1 and the power supply port 22-1, a wire 24-2 for making an electrical connection between the micro USB receptacle connector 21-4 and the operation USB port 23-1 and a wire 24-3 for making an electrical connection between the AV plug 21-5 and the HDMI port 22-2. Further, in-between the wires 24-3 is interposed a converter (not illustrated) for converting the analog audiovisual signal, sent from the SBC 1C, into a digital audiovisual signal and transmitting the same thereto. The other configurations of the docking station 100 are common to those as already explained.

As illustrated in FIG. 5A, in order to connect the SBC 1C electrically to the accessories 110 of the docking station 100, the adapter 10C adapted specifically to the SBC 1C is initially provided and then the SBC 1C is accommodated within the housing portion 12 of the adapter 10C to attach the connectors 3-1 and 3-4 and the AV jack 3-5 respectively to the receptacle connectors 21-1 and 21-4 facing thereto and to the AV plug 21-5. As the SBC 1C is accommodated in and attached to the adapter 10C to take on a configuration of the SBC subunit 30C, the micro USB connector 3-1 and the AV jack 3-5 are respectively connected to the power supply port 22-1 and the audiovisual HDMI port 22-2 of the adapter 10C while the USB connector 3-4 of the SBC 1C is connected to the operation USB port 23-1 of the adapter 10C.

The SBC subunit 30C as shown in FIG. 5B is then accommodated in the SBC storage compartment 140 of the docking station 100 to attach the power supply port 22-1 and the HDMI port 22-2 of the adapter 10C respectively to the power supply receptacle port 130-1 and the audiovisual receptacle port 130-2 that are facing toward the power supply port 22-1 and the HDMI port 22-2 and provided in the docking station 100 in order to readily archive an electrical connection for the SBC 1C to the battery, the monitor, the speaker which are all configured as accessories 110 of the docking station 100. The above-described USB receiver R may be inserted and attached thereto via the outlet window 142 of the docking station 100 into the operation USB port 23-1 to make a wireless electric connection for the SBC 1C to the wireless keyboard and/or the wireless mouse which are configured as the accessories 110.

Figure 6:
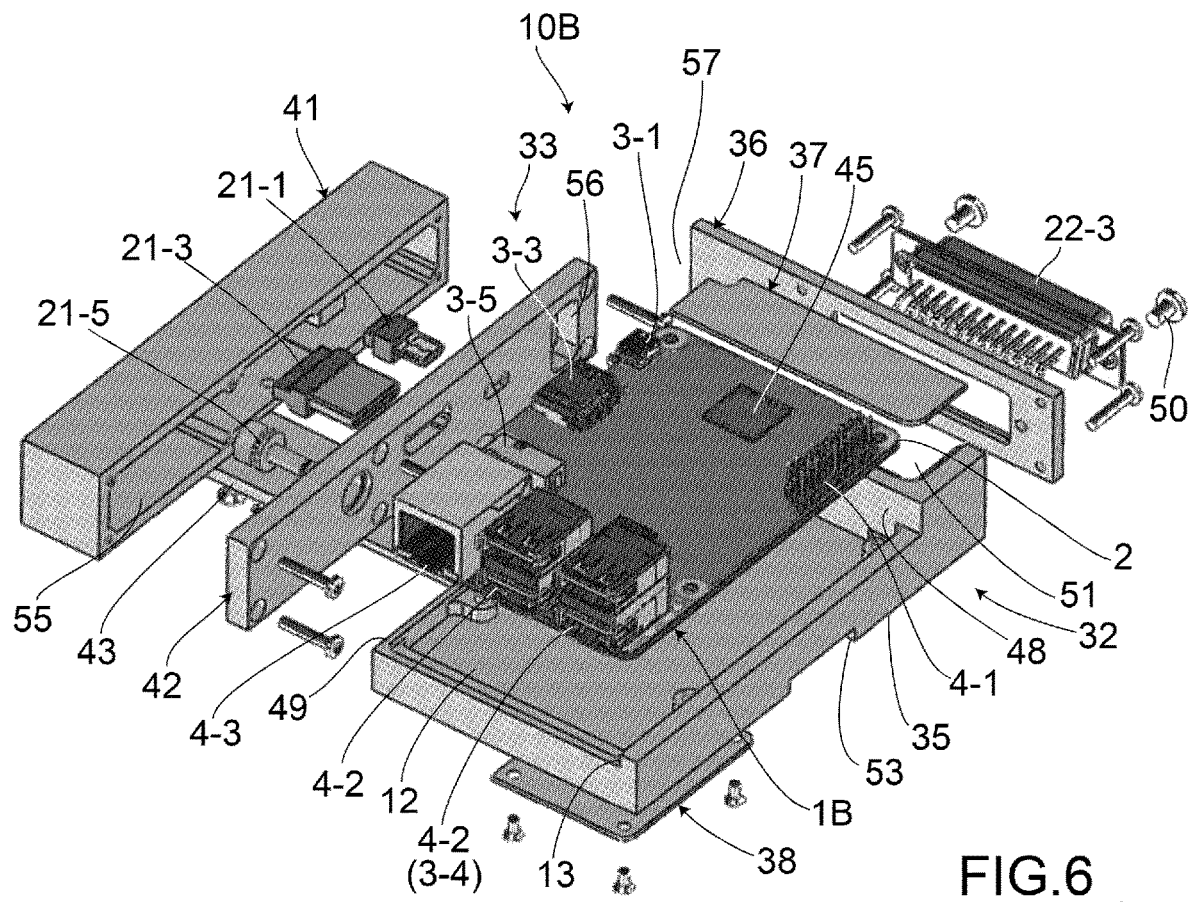
FIG. 6 is an exploded perspective view of the SBC adapter according to an embodiment of the present disclosure.

FIG. 6 illustrates a detailed configuration of the adapter 10B compatible with the SBC 1B as an example of the adapters 10. The adapter body 11 generally is made of a stationary member 32 having the housing portion 12 and a movable member 33 slidably arranged with respect to the stationary member 32. The stationary member 32 is configured such that an output terminal attachment plate 36, an outlet cover 37 and a back cover 38 are attached and fixed on a main frame 35 that is configured as a base forming the bottomed housing portion 12. The movable member 33 is configured such that an input terminal attachment plate 42 and a guide plate 43 are attached and fixed to a movable frame 41 that is formed as a box having a free opening end on one side thereof.

The SBC 1B is configured such that the power supply micro USB connector 3-1 the audiovisual HDMI connector 3-3, the data communication USB connector 3-4 and the audiovisual AV jack 3-5, as well as the above-noted electrical components 45, are arranged as the main connector components 3 on the circuit board 2. The SBC 1B is further configured such that the GPIO pins 4-1, the plurality of USB connector 4-2 in which a part of which have a dual function serving also as the sub connector components 4, and a wired LAN port 4-3 for the network connection are arranged as the sub connector components 4.

The main frame 35 of the stationary member 32 has a bottomed shape, and is formed with a partition 48 in a first side of the housing portion 12 in the lengthwise direction thereof for separating the SBC1B from the wire 24 (not shown). An output terminal attachment plate 36 is provided in the first side in the length direction of the main frame 35 for connecting and fixing the connector component 22 thereto. As such connector components 22, a D-sub connector terminal 22-3 having the power supply port 22-1 and the audiovisual HDMI port 22-2 is attached and fixed to the output terminal attachment plate 36 using attachment components such as a screw 50. The outlet cover 37 is arranged to cover upper surfaces of the output terminal attachment plate 36 and the partition 48 of the main frame 35 such that the wire 24, drawn from the inside of the movable member 33, is disposed in a saclike passage space 51 surrounded by these components.

A back cover 38 is arranged on the bottom of the main frame 35. In the middle of the bottom of the main frame 35 is formed a guiding groove 53 extending in the widthwise direction of the main frame 35. A guide plate 43 is engaged slidably along the guiding groove 53. The back cover 38 may be arranged to cover the underside of the guide plate 43 to prevent the guide plate 43 from falling off the guiding groove 53.

The movable frame 41 of the movable member 33 is configured such that an input terminal attachment plate 42 for mounting and fixing the receptacle connector components 21 is arranged to cover the side opening of the movable frame 41. The wire 24, leading from receptacle connector component 21 to the connector component 22, is drawn from the saclike passage space 55 surrounded by these components 41 and 42 via a communication opening 56 provided in the input terminal attachment plate 42. The communication opening 56 is facing toward the opening 57 of the passage space 51 in the stationary member 32. Here, as the receptacle connector component 21, the power supply micro USB receptacle connector 21-1, a visual HDMI receptacle connector 21-3, primary used for visual communication, and an audio AV plug 21-5, primary used for audio communication, are respectively arranged to be faced with the micro USB connector 3-1, the HDMI connector 3-3 and the AV jack 3-5 of the SBC 1B in a configuration in which the SBC1B is accommodated in the housing portion 12 of the stationary member 32.

Further, on the bottom side of the movable frame 41, there is arranged a guide plate 43 extending in a single directing toward the stationary member 32. The guide plate 43 can be engaged slidably therewith along the guiding groove 53 of the stationary member 32 to readily move the whole movable member 33 manually, with respect to the stationary member 32 accommodating the SBC 1B in the housing portion 12 in a direction, along the guiding groove 53, corresponding to the direction in which the main connector components 3 and the receptacle connector component 21 are detached/attached to each other.

Figure 7:
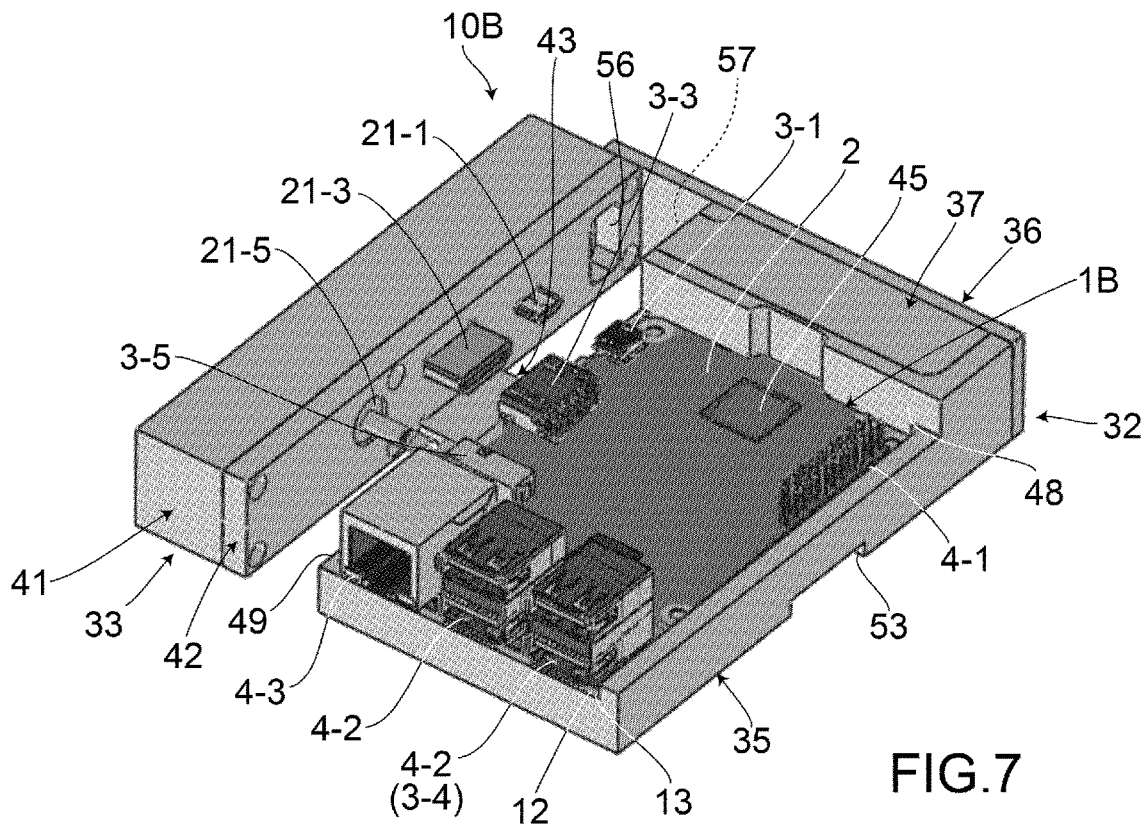
FIG. 7 is a perspective view of the SBC adapter in an open configuration according to an embodiment of the present disclosure.

FIG. 7 illustrates the adapter 10B in an open configuration in which the movable member 33 is displaced from the stationary member 32. The adapter 10B may be positioned in advance in an open configuration to mount the SBC 1B on the housing portion 12 of the stationary member 32. The position of the SBC 1B with respect to the housing portion 12 may be set by abutting the end face of the SBC 1B on the sidewall of the housing portion 12 in order to naturally face the micro USB connector 3-1, the HDMI connector 3-3 and the AV jack 3-5 of the SBC 1B respectively to the power supply micro USB receptacle connector 21-1, the visual HDMI receptacle connector 21-3 and the audio AV plug 21-5 that are provided in the movable member 33.

Figure 8:
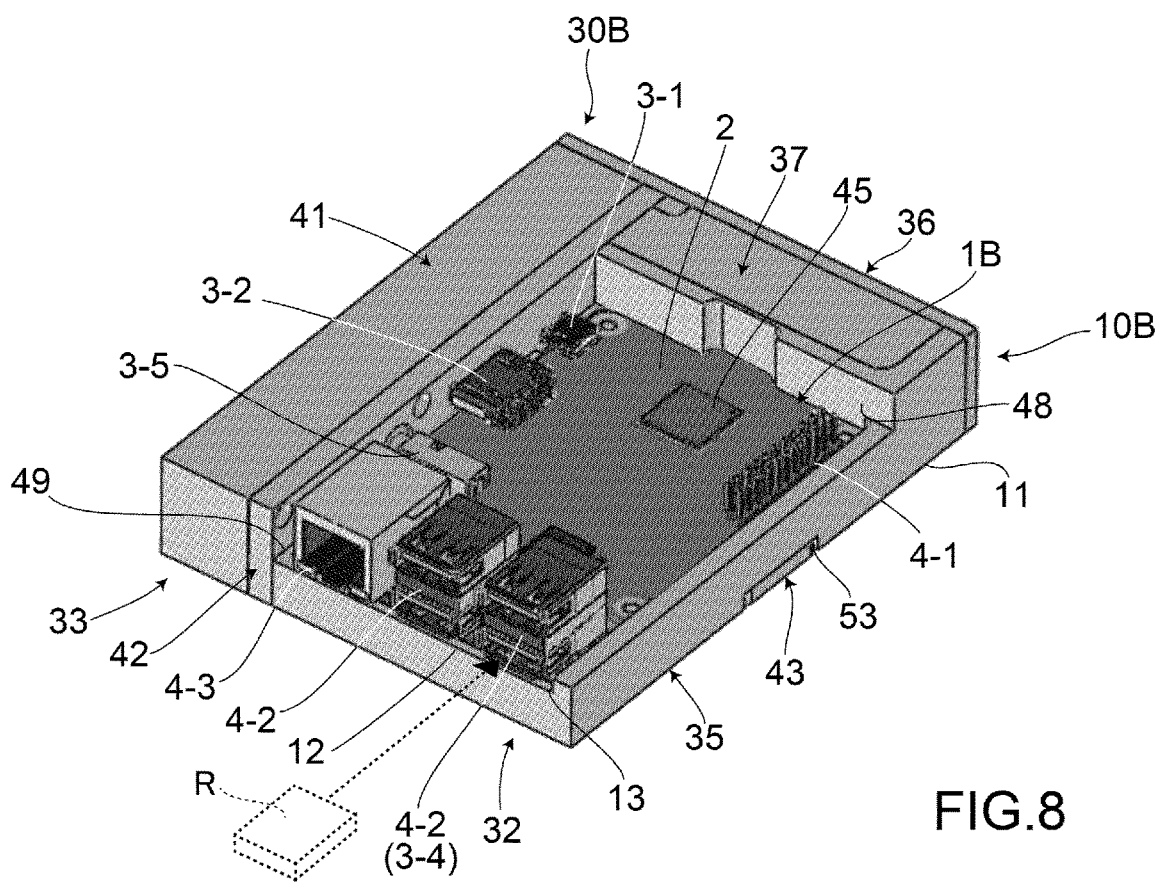
FIG. 8 is a perspective view of the SBC adapter in a connected configuration according to an embodiment of the present disclosure.

FIG. 8 illustrates the adapter 10B in a connected configuration in which the movable member 33 has been moved closer to the stationary member 32 to come into contact with the stationary member 32 from the open configuration as illustrated in FIG. 7. Here, the movable member 33 may be readily be moved manually in a direction along the guiding groove 53 to move the movable member 33 closer to the stationary member 32 to thereby attach the receptacle connectors 21-1, 21-3 and the AV plug 21-5 of the adapter 10B respectively to the connectors 3-1, 3-3 of the SBC 1B and the AV jack 3-5 all at once. Regarding the attachment as described above, once the input terminal attachment plate 42 of the movable member 33 comes into abutment against an abutment face 49 arranged in the main frame 35 of the stationary member 32, the movable member 33 cannot be moved any more toward the stationary member 32. This configuration, therefore, has an advantage of avoiding an excessive stress that may otherwise be applied to the connectors 3-1, 3-3 and the AV jack.

Figure 9:
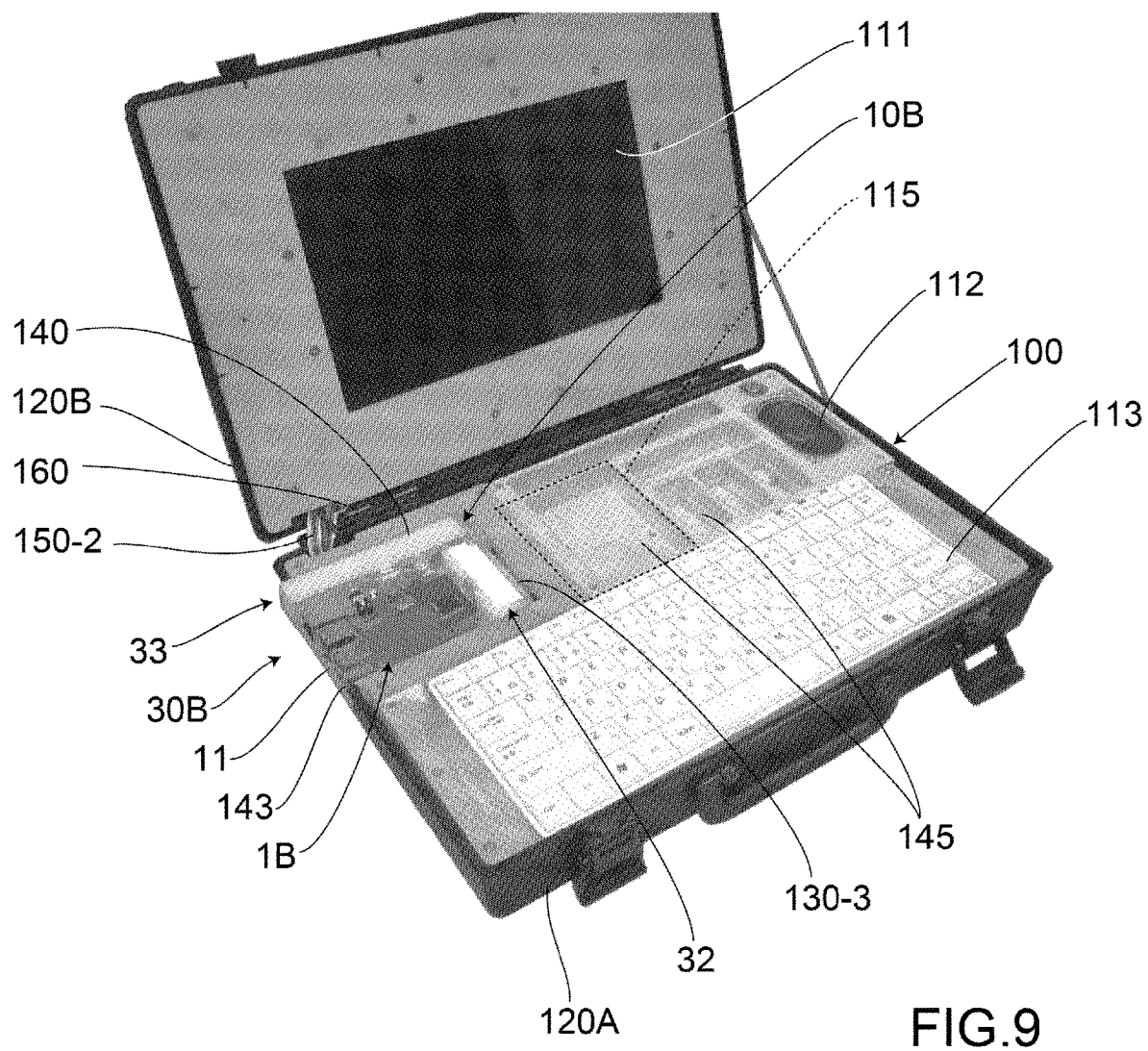
FIG. 9 shows a picture of the docking station fitted with the SBC subunit according to an embodiment of the present disclosure.

FIG. 9 illustrates a configuration in which the SBC subunit 30B as shown in FIG. 8 is accommodated in the SBC storage compartment 140 of the docking station 100. Here, the housing 120 of the docking station 100 is made of a case member 120A and a cover member 120B that are connected with each other via a hinge element 160. The cover member 120B rotatable about the hinge element 160 is openably and closeably provided as a cover of the case member 120A to cover the upper side of the case member 120A.

In addition to the SBC storage compartment 140, the case member 120A is formed with component storage compartments 145 for storing an experimental breadboard and electronic components (not shown). The component storage compartments 145 are formed in a recessed shape such that the upper end of the component storage compartments 145 is open. As the accessories 110 of the docking station 100, a monitor 111 is provided as a display element on the cover member 120B. Further, on the case member 120A are arranged a speaker 112 serving as a sound output element, a wireless keyboard 113 serving as an operating unit and a battery 115 serving as a power source element. A display of the monitor 111 is provided on a cover member 120B on a side opposing to the case member 120A while the keyboard 113 is arranged on the upper side of the case member 120A such that the docking station 100 generally takes on a configuration similar to a portable laptop computer.

On a side of the case member 120A is provided an insertion port 143 for allowing the SBC subunit 30B to be inserted into the SBC storage compartment 140 through a lateral side of the docking station 100. This insertion port 143 also has a function as the outlet window 142. Further, as the adapter body 11 shares a common external shape with all of the adapters 10A to 10C, the SBC storage compartment 140 may accommodate any type of the SBC subunits 30A to 30C through the insertion port 143.

AD-sub receptacle connector terminal 130-3 detachable from or attachable to the D-sub connector terminal 22-3 is arranged as a receptacle connector component 130 of the docking station 100 on a sidewall of the SBC storage compartment 140. The receptacle connector terminal 130-3 includes the power supply receptacle port 130-1 and the audiovisual receptacle port 130-2, and is electrically connected to the battery 115 via a wire 150-1 (not shown). The connector receptacle terminal 130-3 is electrically connected to the monitor 111 and to the speaker 112 via another wire 150-2.

The docking station 100 may be used by arranging the connector terminal 22-3 of the SBC subunit 30B as shown in FIG. 8 to be faced with the connector receptacle terminal 130-3 of the docking station 100 in order to insert the SBC subunit 30B through the insertion port 143 arranged on the lateral side of the docking station 100 into the SBC storage compartment 140. At that time, as the SBC subunit 30B may be inserted in a predetermined direction along the sidewall of the SBC storage compartment 140, the SBC subunit 30B may be readily attached to the connector receptacle terminal 130-3 without deliberately positioning the connector terminal 160-3 at appropriate positions.

As the SBC subunit 30B is accommodated in the SBC storage compartment 140 of the docking station 100, an electric power of the battery 115 is supplied from the connector receptacle terminal 130-3 of the docking station 100 through the power supply micro USB connector 3-1 of the adapter 10B to the SBC 1B. Moreover, a USB receiver R may be inserted through the insertion port 143 into the operation USB port 3-4 of the SBC 1B to mount the USB receiver thereon to thereby make a wireless connection between the SBC 1B and the keyboard 113 provided in the docking station 100.

By virtue of this configuration, a program implemented in the SBC 1B may be activated through an input from the keyboard 113 to send out a video signal of the SBC 1B through the HDMI connector 3-3 to the monitor 111 to thereby display an image on the monitor 111, or to send out a audio signal of the SBC 1C through the AV jack 3-5 to the speaker 112 to thereby sound the speaker 112. Further, a variety of components stored in the component storage compartment 145 may be utilized to, for example, turn on or off a LED mounted on the breadboard by a program instruction of the SBC1B by making a wired connection between the breadboard mounted with electronic components and the GPIO pins 4-1 of the SBC1. In this way, an electric handcraft such as turning on or off the LED may be readily experienced in an easy manner.

As described above, the SBC adapter 10 according to the present embodiment comprises an adapter body 11 adapted to an SBC 1 (such as SBC 1A) selected from a plurality of different SBC 1 each having the electrical components 45 and the first connector components, as main connector components 3, on the circuit board 2. The adapter body 11 is detachably mounted on the docking station 100 provided with the accessories 110 in a configuration in which the adapter body 11 is fitted with the corresponding SBC 1 (such as SBC 1A). For each of the SBCs 1, each adapter body 11 includes: the receptacle connector component 21 configured as the first receptacle connector components detachable from or attachable to the main connector components 3; the connector components 22 configured as second connector components detachable from or attachable to the receptacle connector components 130 configured as the second receptacle connector components electrically connecting to the accessories 110; wires 24 configured to make an electrical connection between the receptacle connector components 21 and the connector components 22.

In a configuration as described above, as the adapter bodies 11 are individually provided in correspondence to a variety of SBCs with different standards of the main connector components 3, there may be selected one adapter body 11 to which the corresponding SBC 1 is attached such that the main connector components 3 of the SBC1 are fixed to the receptacle connector component 21 of the adapter body 11 to attach the connector components 22 of the adapter body 11 to the receptacle connector component 130 of the docking station 100 to thereby archive an electrical connection between the SBC 1 and the accessories 110 mounted on the docking station 100. Accordingly, the SBC 1 may be readily used without taking time and effort to wire and arrange the accessories 110 for any types of the products A, B, C . . . N of the SBC1.

Further, in the present embodiment, the adapter body 11 includes the stationary member 32 having the housing portion 12 for the SBC 1 and the movable member 33, mounted with the receptacle connector component 21, which is slidably arranged with respect to the stationary member 32. The main connector components 3 and the receptacle connector component 21 are arranged to be faced with each other along a moving path of the movable member 33 when the SBC 1 is accommodated in the housing portion 12.

By virtue of this configuration, the main connector components 3 mounted on the circuit board 2 of the SBC 1 may be readily detached from or attached to the receptacle connector components 21 fixed on the adapter body 11 to make a more quick usage of the SBC 1 just by displacing the movable member 33 in a predetermined direction relative to the stationary member 32 accommodating the SBC 1 in the housing portion 12.

Further, according to the present embodiment, the adapter bodies 11 share a common external shape for all of the SBCs 1, and are mounted with the same connector components 22 at the same positions for all of the SBCs 1. That is, the adapter bodies 11 have an external shape common to all of the plurality of different SBCs, and are mounted with the connector components 22 that are identically designed for all of the plurality of different single board computers and are arranged at positions common to all of the plurality of different single board computers.

For this reason, the adapter body 11 mounted with the SBC 1 has the same external shape irrespective of the type of the SBCs 1, and the adapter body 11 is mounted with the same connector components 22 at the same positions for all of the SBCs. As the result, the docking station 100 may employ the same receptacle connector component 130 having an external receptacle shape identical for all of the SBCs 1, thus enhancing the versatility of the docking station 100.

With reference to FIGS. 6 to 8 illustrating the configuration of the SBC 1B, the stationary member 32 of the present embodiment includes a guiding groove 53 extending along the moving path of the movable member 33, and the movable member 33 includes the guide plate 43 configured as a plate member slidably engageable with the guiding groove 53 along the guiding groove 53. By virtue of this configuration, the movable member 33 may be easily displaced, relative to the stationary member 32 accommodating the SBC 1B in the housing portion 12, in a direction along the guiding groove 53 to attach or detach the more or more main connector components 3 and the corresponding one or more receptacle connector components 21 respectively from each other.

The housing portion 12 of the present embodiment includes sidewalls in a perimeter thereof, and the sidewalls include a first abutment face configured to allow the main connector components 3 to face the receptacle connector components 21 when an end face of the single board computer SBC 1B is abutted against the first abutment face. By virtue of this configuration, the position of the SBC 1B relative to the housing portion 12 may be naturally set so that the main connector components 3 of the SBC 1B and the receptacle connector components 21 of the adapter 10B are faced with each other when the SBC 1B is accommodated in the housing portion 12 of the stationary member 32.

The connector components (or D-sub connector terminal 22-3), serving as the second connector components, are mounted on the stationary member 32, and the first abutment face is configured as a partition 48 separating the SBC 1B, accommodated in the housing portion 12, from the wires 24 being drawn from the movable member 33 and connecting to the connector components 22. By virtue of this configuration, the first abutment face, configured originally for positioning the main connector components 3 of the SBC 1B and the receptacle connector components 21 of the adapter 10B to be faced with each other, may also be served as a partition 48 for keeping the wires 24, drawn from the movable member 33, off the SBC 1B accommodated in the housing portion 12.

In the present embodiment, the stationary member 32 includes a second abutment 49 face 49 separately provided from the first abutment face. The second abutment face 49 comes into abutment with the movable member 33 when the movable member 33 has been displaced to the stationary member 32. By virtue of this configuration, once the movable member 33 comes into abutment against the abutment face 49 of the stationary member 32, the movable member 33 cannot be moved any more toward the stationary member 32. For this reason, the connectors 3-1 and 3-2 serving as the main connector components 3 and the AV jack 3-5 may be respectively attached to the opposing connectors 21-1 and 21-3 and the AV plug 21-5 serving as the receptacle connector components 21 without exerting an excessive stress thereto.

In the present embodiment, as the SBC 1B is accommodated in the housing portion 12 of the stationary member 12, the main connector components 3, arranged on one side in a lengthwise direction of the circuit board 2 having a rectangular shape when viewed from above, are faced with the receptacle connector components 21 attached to the movable member 33. As the movable member 33 has been displaced to the stationary member 32, the main connector components 3 are attached to the receptacle connector components 21 to make an electrical connection therebetween. Meanwhile, on one side in a widthwise direction of the circuit board 2 perpendicular to the lengthwise direction, there may be arranged the USB connectors 4-2 or the wired LAN port 4-3 configured as the one or more third connector components that are mounted on the circuit board 2 along with the main connector components 3 but are not connected to the receptacle connector components 21. The immovable member 32 provides an opening 13 facing toward these USB connectors 4-2 or the wired LAN port 4-3. That is, the third connector components of the SBC 1B are configured to be attached with some external devices other than the receptacle connector components 21 through the opening 13.

As illustrated in FIG. 8, the opening 13 is provided in one side in the widthwise direction of the housing portion 12 accommodating the circuit board 2 to mount the same while the partition is arranged on the other side of the housing portion 12 in the widthwise direction such that a direction in which the USB receiver R configured as an external device are inserted via the opening 13 into the third connector components such as a USB connector 4-2 to be attached thereto coincide with a direction in which an end face of the single board computer abuts against the partition 48 configured as the first abutment face when the SBC is accommodated in the housing portion 12 of the stationary member 12. By virtue of this configuration, when inserting an external device such as the USB receiver R, via the opening 13 of the stationary member 32, into the USB connector 3-4 of the SBC 1B, once an end face of the SBC 1B comes into abutment with the partition 48, the SBC 1B cannot be moved any more inside the housing portion 12. For this reason, the partition 48, configured originally for positioning the main connector components 3 of the SBC 1B and the receptacle connector components 21 of the adapter 10B to be faced with each other, may also be served to stably attach the external devices to the USB connectors 3-4.

In the present embodiment, the movable member 33 includes a first passage space 55 having an interior partly enclosed by the input terminal attachment plate 42 configured as the first attachment plate for attaching the receptacle connector components 21 thereto, and the stationary member 32 includes a second passage space 51 having a saclike interior being partly enclosed by the output terminal attachment plate 36 configured as the second attachment plate configured for attaching the connector components 22 thereto. Moreover, the movable member 33 further includes a communication opening 56, as an outlet opening of the first passage space 55, for guiding the wires 24 from the receptacle connector components 21 to the connector components 22, and the communication opening is arranged opposite to the opening 57 provided as an entrance opening of the second passage space 51. By virtue of this configuration, there may be minimized an exposed area of the wires 24 between the movable member 33 and the stationary member 32 while electrically connecting the receptacle connector components 21 to the connector components 22 with the shortest wiring distance.

The second passage space 51 of the present embodiment is formed between the partition 48 serving as a sidewall of the housing portion 12 and the output terminal attachment plate 36. By virtue of this configuration, the passage space 51, interposed between the partition 48 and the second attachment plate, helps to avoid an excessive stress that may otherwise be applied to the connector components 22, attached to the output terminal attachment plate 36, and the receptacle connector components 130 of the docking station 100 connected to the connector components 22 even when an end face of the SBC 1B is strongly hit against the partition 48 within the housing portion 12 of the stationary member 32. Moreover, the wires 24 accommodated in the passage space 51 may be safely protected.

The SBC storage dock of the present embodiment having the adapter 1 and the docking station 100 may utilize the SBC 1, serving as one of the various small computers that are already available or to be released in the future, via the adapter by accommodating the SBC 1 in the common docking station 100 to thereby utilize the docking station 100 in a versatile manner for a variety of SBCs having different functionalities. Further, a set of accessories 110 may be stored in the compact small housing 120 of the docking station 100, thus providing a convenient portability for carrying them around. Furthermore, various components such as breadboard or electrical components may be stored in the component storage compartment 145 of the docking station 100 in order to readily use the docking station 100 not only as a laptop computer but also for the experimental purpose of the electrical handicraft.

These features of the SBC adapter in the embodiments as described above and their advantages obtained therefrom may also be applied to the SBC storage dock including the docking station 100 mounted with accessories 100 and the adapter body 11 adapted specifically to, for example, the SBC 1A selected from a plurality of different SBCs 1 each including the circuit board 2, one or more electronic components 45 mounted on the circuit board 2 and the one or more main connector components mounted on the circuit board 2, the adapter body being detachably mountable, in a configuration being fit with the corresponding SBC 1A, on the docking station 100.

The educational advantages of the SBC storage dock will be outlined below. First, the docking station 100 is more affordable than a regular laptop computer, and thus easily available even for elementary school children. Second, an educational institution such as school or academy who are working on a programming education may readily employ the docking station 100 as a low-price educational tool. These SBCs 1 include an SBC 1 that has originally been developed as a programming educational tool for children, and pre-installed in the SBC1 with world-famous visual programming tools or programming language. For this reason, the SBC 1 may readily be usable as a tool for programming education if the SBC 1 is connected to the accessories 110 on the docking station 100. Further, as the present embodiment provides not only a programming learning but also an electric handicraft, the present embodiment systematically provides learning opportunity for a physical computing such as structures of IoT devices.

Although the preferred embodiments of the present disclosure have been described above, the present disclosures are not limited to the above embodiments, and various modifications can be made without departing from the spirit of the present disclosures. For example, the shape of each adapter 10 or the arrangements of the components to be fixed to the adapter body shall not be limited to those described in the embodiments. Note that the external device herein includes not only the above-described USB receiver R attachable to the USB connectors 3-4 mounted on the SBC1B but also a USB cable for making a connection to the USB connectors 4-2, and a LAN cable for making a connection to the LAN port 4-3.

What is claimed is:

1. An adapter for single board computer comprising:
an adapter body adapted to a specific single board computer selected from a plurality of different single board computers each including a circuit board, one or more electronic components mounted on the circuit board and one or more first connector components mounted on the circuit board, said adapter body being detachably mountable, in a configuration being fitted with the specific single board computer, on a docking station mounted with one or more accessories;
one or more first receptacle connector components mounted on the adapter body, and being detachable from or attachable to the first connector components;
one or more second connector components mounted on the adapter body, and being detachable from or attachable to one or more second receptacle connector components electrically connected to the accessories; and
one or more wires arranged in the adapter body and electrically connecting the first receptacle connector components respectively to the second connector components,
wherein said adapter body comprises:
a stationary member having a housing portion for the single board computer; and
a movable member mounted with the first receptacle connector components, said movable member being movable with respect to the stationary member, and
wherein the first connector components and the first receptacle connector components are arranged to be faced with each other along a moving path of the movable member when the single board computer is accommodated in the housing portion.

2. The adapter according to claim 1, wherein the stationary member comprises a guiding groove extending along the moving path of the movable member, and the movable member is provided with a plate member slidably engageable with the guiding groove therealong.

3. The adapter according to claim 1, wherein the housing portion comprises sidewalls in a perimeter thereof, the sidewalls including a first abutment face configured to allow the first connector components to face the first receptacle connector components when an end face of the single board computer is abutted against the first abutment face.

4. The adapter according to claim 3, wherein the second connector components are mounted on the stationary member, and the first abutment face is configured as a partition separating the single board computer, accommodated in the housing portion, from the wires being drawn from the movable member and connected to the second connector components.

5. The adapter according to claim 3, wherein the stationary member comprises a second abutment face that comes into abutment with the movable member when the movable member has been displaced to the stationary member.

6. The adapter according to claim 3, wherein
the stationary member includes an opening facing toward one or more third connector components, said third connector components being mounted on the circuit board along with the first connector components but not connected to the first receptacle connector components, and
the opening and the first abutment face are respectively arranged on first and second opposing ends of the housing portion such that a direction in which external devices are inserted via the opening into the third connector components to be attached thereto coincide with a direction in which an end face of the single board computer abuts against the first abutment face when the single board computer is accommodated in the housing portion.

7. The adapter according to claim 6, wherein
the movable member includes a first passage space having an interior closed by a first attachment plate configured to attach the first receptacle connectors,
the stationary member includes a second passage space having an interior closed by a second attachment plate configured to attach the second connectors, and
the movable member further includes a communication opening for guiding the wires from the first receptacle connector components to the second connector components, said communication opening being arranged opposite to an entrance opening of the second passage space.

8. The adapter according to claim 7, wherein the second passage space is formed between the sidewalls and the second attachment plate.

9. The adapter according to claim 1, wherein the adapter body has an external shape identically designed for all of the different single board computers, and is mounted with the second connector components that are identically designed for all of the different single board computers and are arranged at positions common to all of the different single board computers.

10. A storage dock for single board computer comprising:
a docking station mounted with one or more accessories;
an adapter body adapted to a specific single board computer selected from a plurality of different single board computers each including a circuit board, one or more electronic components mounted on the circuit board and one or more first connector components mounted on the circuit board, said adapter body being detachably mountable, in a configuration being fitted with the specific single board computer, on the docking station;
one or more first receptacle connector components mounted on the adapter body, and being detachable from or attachable to the first connector components;
one or more second connector components mounted on the adapter body, and being detachable from or attachable to one or more second receptacle connector components electrically connected to the accessories; and
one or more wires arranged in the adapter body and electrically connecting the first receptacle connector components respectively to the second connector components,
wherein said adapter body comprises:
a stationary member having a housing portion for the single board computer; and
a movable member mounted with the first receptacle connector components, said movable member being movable with respect to the stationary member, and
wherein the first connector components and the first receptacle connector components are arranged to be faced with each other along a moving path of the movable member when the single board computer is accommodated in the housing portion.

* * * * *